Dec. 18, 1934.    A. K. SORENSEN    1,984,770
REVERSIBLE VALVE OPERATING MECHANISM
Filed July 19, 1929    3 Sheets-Sheet 1

Witness
R. B. Davison

Inventor
Alfred K. Sorensen
By Ira J. Wilson
Atty.

Dec. 18, 1934.  A. K. SORENSEN  1,984,770
REVERSIBLE VALVE OPERATING MECHANISM
Filed July 19, 1929   3 Sheets-Sheet 2
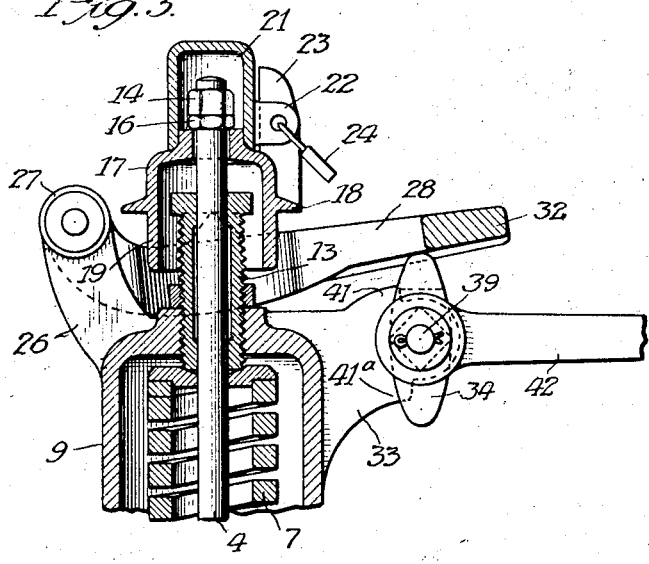
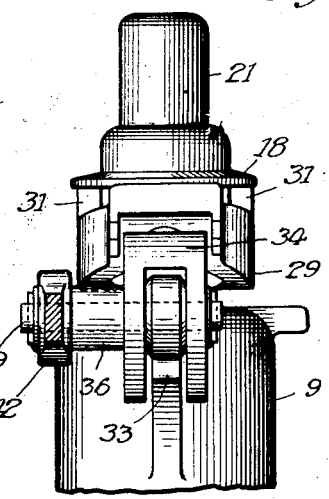
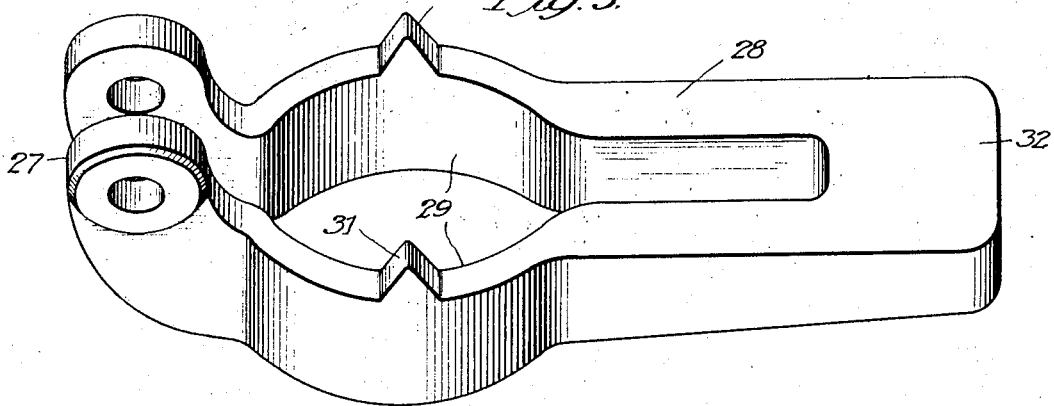
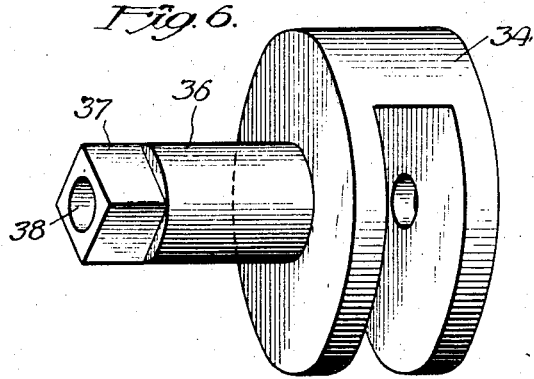
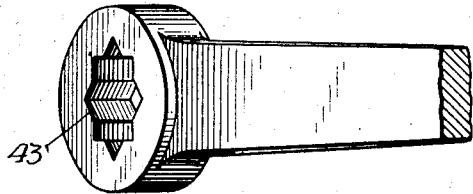
Inventor
Alfred K. Sorensen Dec. 18, 1934.  A. K. SORENSEN  1,984,770
REVERSIBLE VALVE OPERATING MECHANISM
Filed July 19, 1929  3 Sheets-Sheet 3
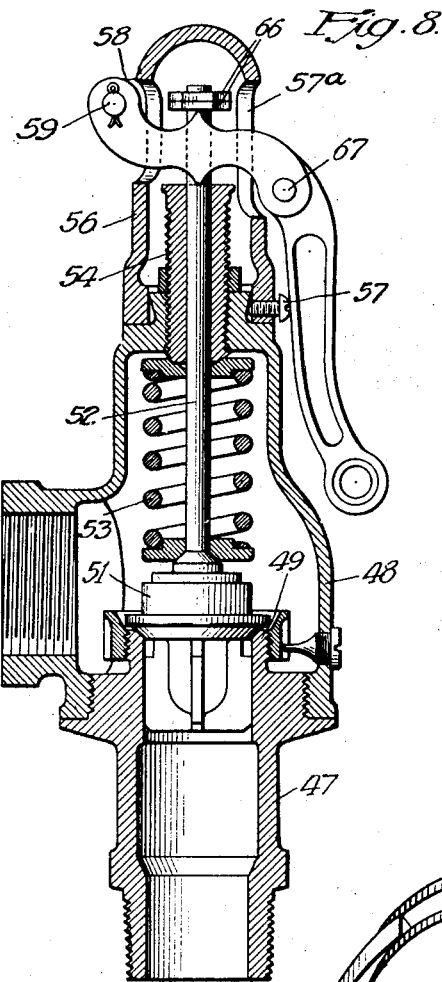
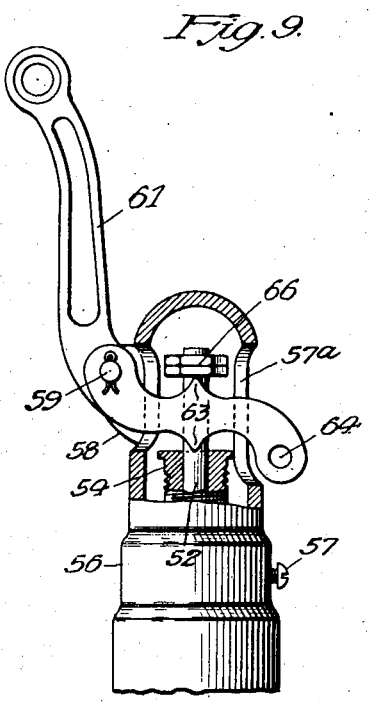
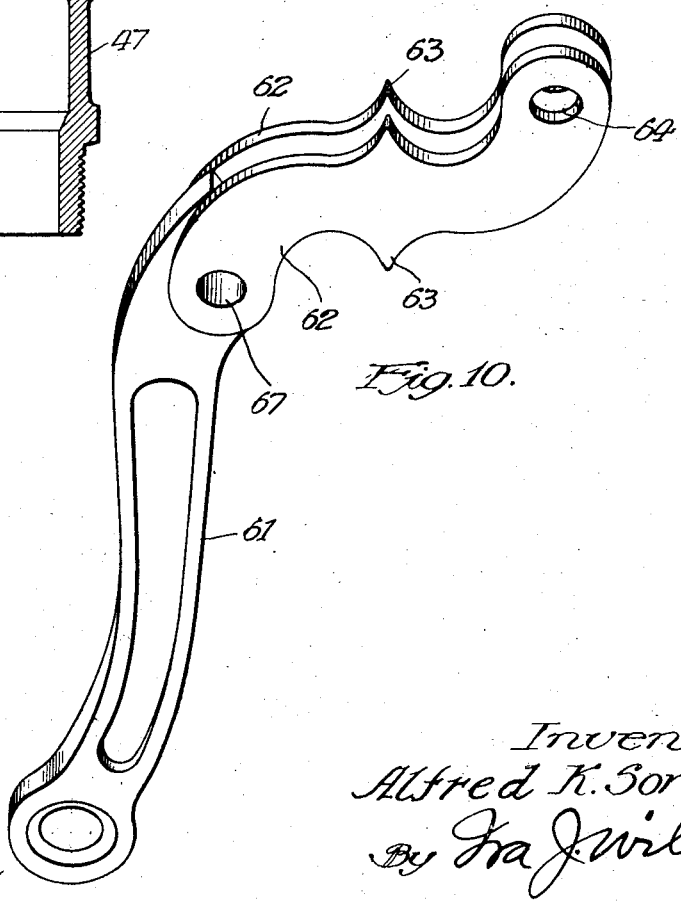
Inventor
Alfred K. Sorensen Patented Dec. 18, 1934

1,984,770

UNITED STATES PATENT OFFICE 1,984,770

REVERSIBLE VALVE OPERATING MECHANISM

Alfred K. Sorensen, Chicago, Ill., assignor to Crane Co., Chicago, Ill., a corporation of Illinois Application July 19, 1929, Serial No. 379,430

2 Claims. (Cl. 137—53)

This invention relates to valve operating mechanisms particularly such mechanism specially suited for operating safety valves and the like.

There is no standardized position or place for setting a safety valve and consequently they are usually placed in rather inaccessible places or any place convenient to the rest of the piping and mechanism. As these valves must be installed in a manner that they may be manually operated it has heretofore been necessary that a large variety of styles of operating levers and mechanisms be made and carried in stock in order to satisfy the many positions and conditions under which they must be capable of operating their respective valves.

It is the purpose of this invention to provide an operating mechanism which is capable of being adjusted to receive and transmit a pull from any direction to the valve whereby the valve to which it is applied may be operated regardless of the position in which it is secured. Accordingly there is provided an operating handle or lever whose initial position may be adjusted either as to position in various planes or as to a plurality of positions in one plane. To accomplish the first adjustment i. e., adjustment from one plane to another, the operating lever may be pivoted to a rotatable bonnet structure. To accomplish the second movement the point of attachment of the lever to the bonnet structure may be varied or the lever may be rotated about its point of attachment to be secured in any one of several positions.

This invention is applicable to both iron valve structures and brass valve structures as will be more readily understood from the following description given in connection with the drawings in which:

Fig. 3 is a vertical section through the upper part of the valve structure shown in Fig. 1 but illustrating the open position.

Fig. 4 is an end elevation of that portion of a valve shown in Fig. 3.

Fig. 5 is an enlarged perspective detail of the hinge element embodied in the iron valve structure.

Fig. 6 is an enlarged perspective detail of the cam element used in the iron valve structure.

Fig. 7 is an enlarged detail of a portion of the operating lever embodied in the iron valve structure.

Fig. 8 is a vertical section through a brass valve constructed in accordance with this invention.

Fig. 9 is a vertical section through the upper part of a brass valve showing the operating lever in reversed position and Fig. 10 is an enlarged perspective detail of the reversible lever used in brass valve construction.

Figure 1:
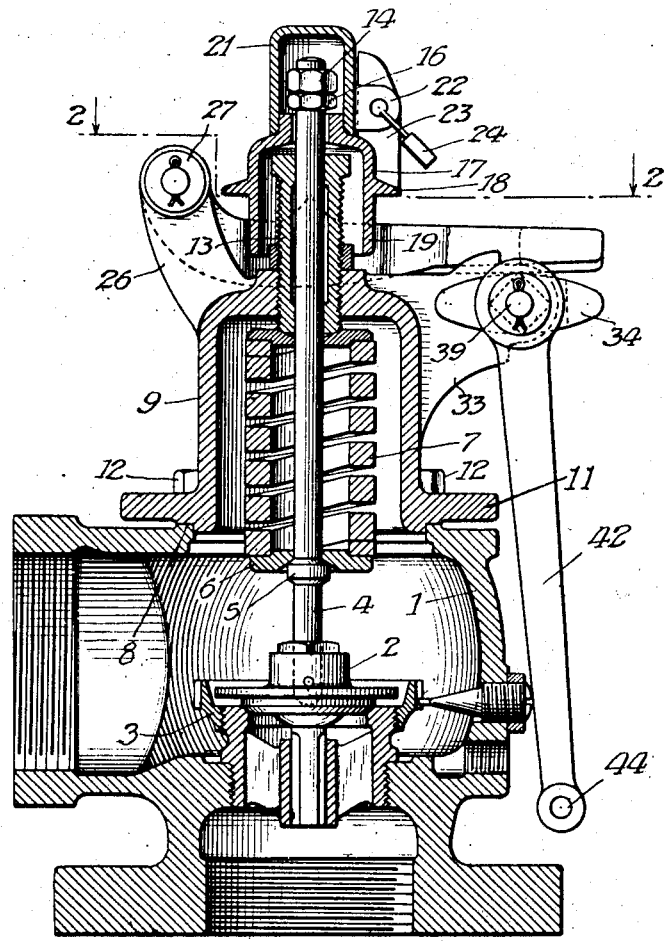
Fig. 1 is a vertical section through an iron valve structure illustrating one embodiment of this invention.
Figure 2:
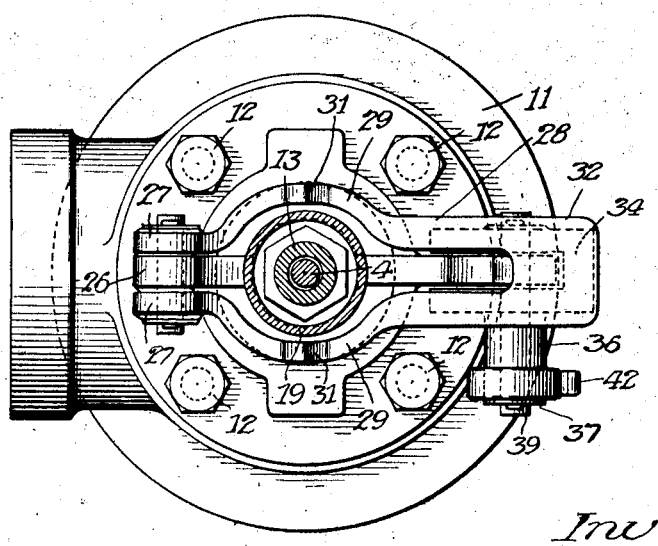
Fig. 2 is a section on the line 2—2 of Fig. 1.

This invention is particularly well adapted to safety valve construction in which the valve is normally held closed by means of a spring, weight or similar device. In the illustrated embodiment shown in Figures 1 to 7 inclusive there is shown what is generally termed an iron body pop safety valve comprising the usual body 1 having a valve 2 seating on a valve seat 3. Valve 2 is actuated through a valve rod 4 having a rigidly secured collar 5 thereon which engages a spring cap 6 inserted over one end of a compression spring 7. The top of the body 1 is formed with a circular opening therein through which spring 7 extends. The peripheral edge 8 of the opening is faced and finished to form a seat for a bonnet member 9. The lower end of the bonnet is of circular formation and of proper diameter to fit within the opening in the body member and may also be formed with a flange 11 drilled to receive securing screws 12. It is obvious from the above that the bonnet may be rotated on the edge 8 and secured in any one of four positions. The upper end of the bonnet is drilled and tapped in the usual manner to receive an adjusting screw 13 to compress spring 7 to the desired tension thus setting the valve to blow off at any desired pressure. The valve rod 4 extends upwardly through the adjusting screw 13 and is threaded upon its upper end to receive nut 16 and lock nut 14. Beneath nuts 14 and 16 and surrounding adjusting collar 13 is a hood 17 having a lateral flange 18 and skirt 19 depending around the adjusting screw to prevent unauthorized adjustment thereof. A cap 21 is placed over the upper end of rod 4 and fits upon hood 17 and is sealed thereto by means of an ear 22 adjoining a vertical rib 23 formed integrally on hood 17. The cap 21 may be sealed to hood 17 by means of a seal or lock 24.

For manual operation of the valve, bonnet 9 is formed with an upstanding ear 26 to which is pivotally secured the bifurcated end 27 of a hinge element 28. The hinge element is formed with a pair of semi-circular arm portions 29 surrounding hood 17, the arms having contact points 31 upon the upper edge thereof adapted to engage flange 18. Upon the opposite end arms 29 terminate in an integral cam surface 32. Substantially diametrically opposite the ear 26 hood 9 is provided with a laterally extending ear 33 to which is pivotally secured a bifurcated cam element 34 having an integral shaft 36 extending centrally therefrom and terminating in a squared portion 37. The ear 33 and cam 34 are drilled as at 38 to receive a fulcrum pin 39. As illustrated particularly in Figures 1 and 3, cam 34 when straddling and pinned to ear 33 is adapted to engage the cam surface 32. Upon rotation of cam 34 it will raise hinge 28, cause contact points 31 to engage flange 18 of hood 17 which in turn will contact with lock nuts 16 and raise rod 4 and consequently valve 2 upwardly from its seat 3. In order to prevent cam 34 from being rotated too far and becoming locked in the open position, ear 33 is provided with lugs 41 and 41a which are adapted to contact with the closed end of cam 34 as illustrated in Fig. 3. A lever 42 having an octagonal opening 43 in one end thereof and a round opening 44 in the other end thereof is provided to fit upon the squared end 37 of shaft 36. It is apparent that by means of the octagonal opening 43 lever 42 may be inserted over the end of shaft 36 in any one of a plurality of positions.

Upon the installation of these valves the bonnet may be secured in any one of four positions thus permitting the lever to extend in any one of four directions in two different planes. Furthermore the lever itself may be secured upon shaft 36 with its operating end projecting downwardly or upwardly or any intermediate position between the two within the same plane according to whether it is possible to obtain a pull upwardly, downwardly or outwardly for operating the lever. Upon operating the lever 42 cam 34 will engage the end 32 of hinge 28 which hinge will in turn be swung about its pivot at its bifurcated end 27 thus causing points 31 to engage flange 18 of hood 17 which hood will in turn engage nut 16 and raise valve rod 4 and valve 2 from seat 3.

In Figs. 8 to 10 inclusive there is illustrated a brass valve constructed to embody the features of this invention. In this construction the valve body is formed of two parts, the lower section 47 and upper section 48. As is customary, the lower section 47 carries the valve seat 49, whereas, the upper section 48 carries the valve 51, stem 52, compression spring 53 and adjusting screw 54. This mechanism is all standard construction and is therefore not described in detail. As in the iron valve construction the brass valve carries a bonnet 56, the lower end of which is rotatably fitted upon the upper end of the body section 48 and is adapted to be locked in any angular position by means of a screw 57. Adjacent its upper end bonnet 56 has an opening 57a formed through both walls thereof. Adjacent the edges of the opening through one wall there is provided a pair of laterally projecting lugs 58 drilled to receive a pivot pin 59. A reversely curved operating lever 61 having one end portion thereof bifurcated to form two arms 62 having contact points 63 intermediate their length and being drilled as at 64 upon their ends, is pivoted at 64 to lugs 58 by means of pin 59 with the lever extending through the bonnet and with arm 62 straddling the upper end of rod 52. Points 63 are adapted to engage the lowermost of nuts 66 threadedly secured to the upper end of valve rod 52. Intermediate points 63 and the projecting end of lever 61 the lever is drilled as at 67 to provide another fulcrum point for lever 61.

The operation of the brass valve is substantially the same as the operation of the iron valve, that is, as lever 61 is swung about pivot pin 59 points 63 will bear against nut 66 and accordingly raise rod 52 and valve 51 from its seat 49.

It follows from the above that the lever 61 may be secured in position by means of pin 59 passing through opening 64 with the lever handle projecting downwardly as shown in Fig. 8 or that lever 61 may be secured in position by means of pin 59 passing through aperture 67 with the handle portion projecting upwardly as illustrated in Fig. 9 both positions being relatively in the same plane. As in the valve previously described lever 61 may be adjusted into different planes by a rotating bonnet 56 into any desired position.

From the above description it is apparent that there has been provided a valve structure of the safety valve type manually operable by a lever which permits of installation in substantially any position without interference with the manual operation of the valve through the means of a single lever thus eliminating the necessity for making and carrying in stock various and peculiarly shaped operating levers.

It is obvious that minor changes may be made in the details of construction without departing from the spirit and scope of the invention as defined in the following claims:

1. A valve structure including a valve body having a valve therein, a valve rod extending from said valve, a pivoted lever for actuating said valve rod and means for selectively securing said lever in any one of a plurality of initial positions with respect to said valve rod in the plane of said lever and means for selectively securing said lever in any one of a plurality of different planes independently of any movement of said valve rod.

2. A valve and operating mechanism therefor comprising a valve body having a valve therein and a valve rod protruding from said valve body, a hinged member constructed to unseat the valve when rotated in a plane of the valve rod, means for mounting said member in a plurality of positions angularly about said rod relatively to said valve body, and a lever constructed for lifting said member pivoted for rotation in a plane parallel to said valve rod, said lever being constructed for selective positioning in a plurality of neutral positions angularly relatively to said member whereby operative rotation of the lever from some of said positions may be toward the valve seat and from others of said positions may be away from the valve seat.

ALFRED K. SORENSEN.